United States Patent
Huang

(10) Patent No.: US 11,852,872 B2
(45) Date of Patent: Dec. 26, 2023

(54) OPTICAL FIBER SPLICE WITH ADJUSTABLE SLEEVE

(71) Applicant: CLOUD LIGHT TECHNOLOGY LIMITED, Hong Kong (HK)

(72) Inventor: Chieh-Tse Huang, Hong Kong (HK)

(73) Assignee: CLOUD LIGHT TECHNOLOGY LIMITED, Hong Kong (HK)

( * ) Notice: Subject to any disclaimer, the term of this patent is extended or adjusted under 35 U.S.C. 154(b) by 133 days.

(21) Appl. No.: 17/718,346

(22) Filed: Apr. 12, 2022

(65) Prior Publication Data
US 2023/0324629 A1    Oct. 12, 2023

(51) Int. Cl.
*G02B 6/38*    (2006.01)
*G02B 6/42*    (2006.01)
*G02B 6/255*   (2006.01)

(52) U.S. Cl.
CPC ........... *G02B 6/387* (2013.01); *G02B 6/4219* (2013.01); *G02B 6/2558* (2013.01); *G02B 6/3801* (2013.01)

(58) Field of Classification Search
None
See application file for complete search history.

(56) References Cited

U.S. PATENT DOCUMENTS

| | | | | |
|---|---|---|---|---|
| 2002/0122637 A1* | 9/2002 | Anderson | ............... | G02B 6/421 385/89 |
| 2002/0197022 A1* | 12/2002 | Mine | .................... | G02B 6/4228 385/88 |
| 2010/0254655 A1* | 10/2010 | Bergann | .................. | G02B 6/32 385/139 |
| 2011/0091163 A1* | 4/2011 | Shimotsu | ............. | G02B 6/3883 385/76 |
| 2013/0294731 A1* | 11/2013 | Van Der Mee | ...... | G02B 6/4284 385/76 |
| 2015/0253524 A1* | 9/2015 | Ito | ........................ | G02B 6/4278 385/92 |
| 2018/0059330 A1* | 3/2018 | Evans | ...................... | G02B 6/32 |

* cited by examiner

*Primary Examiner* — Jerry Rahll

(57) ABSTRACT

The application provides an optical fiber splice with an adjustable sleeve, which comprises: a carrier, an optical fiber cable and an adjustable sleeve. The carrier has a first fixed end and a second fixed end along an optical fiber extension direction. The optical fiber cable has a cable part and an optical fiber outlet part. The optical fiber outlet part extends from the cable part and is fixed to the first fixed end. The adjustable sleeve is sleeved on the cable part. An outer peripheral surface of the adjustable sleeve is provided with a plurality of positioning features. Wherein in the optical fiber extension direction, the positions of the positioning features disposed on the adjustable sleeve are deviated from each other by a distance. One of the positioning features is fixed to the second fixed end.

8 Claims, 3 Drawing Sheets

OPTICAL FIBER SPLICE WITH ADJUSTABLE SLEEVE

BACKGROUND OF THE INVENTION

1. Field of the Invention

The present application relates to an optical fiber splice, and in particular to an optical fiber splice with an adjustable sleeve.

2. Description of the Related Art

An optical fiber splice is located at the end of an optical fiber transmission line and is a component that converts the optical signal into an electric signal or the electric signal into an optical signal. The current design of the optical fiber splice is that the last segments of optical fibers of an optical fiber cable are exposed and fixed to a photoelectric conversion device, and the optical fiber cable is also fixed to a fixed point of a carrier. However, the length of the exposed optical fiber has a larger manufacturing tolerance and sometimes does not fully match the distance of the photoelectric conversion device to the fixed point mentioned above. When the length of the exposed optical fiber is short, it cannot be assembled or is damaged by excessive pulling; when the length of the exposed optical fiber is longish, it will cause the optical fiber to bend and the signal is poor, and it may be damaged over a long period of time.

BRIEF SUMMARY OF THE INVENTION

Therefore, in order to solve the various problems of the traditional optical fiber splice, the application provides an optical fiber splice with an adjustable sleeve.

To achieve the above objective and other objectives, the present application provides an optical fiber splice with an adjustable sleeve, which comprises: a carrier, the carrier has a first fixed end and a second fixed end along an optical fiber extension direction; an optical fiber cable, the optical fiber cable has a cable part and an optical fiber outlet part, the optical fiber outlet part extends from the cable part and is fixed to the first fixed end; and an adjustable sleeve, sleeved on the cable part, an outer peripheral surface of the adjustable sleeve is provided with a plurality of positioning features, wherein in the optical fiber extension direction, the positions of the positioning features disposed on the adjustable sleeve are deviated from each other by a distance, one of the positioning features is fixed to the second fixed end.

In an embodiment of the application, the outer peripheral surface of the adjustable sleeve is rectangular, upper and lower sides of the adjustable sleeve are respectively provided with one of the positioning features.

In an embodiment of the application, the outer peripheral surface of the adjustable sleeve is square, four sides of the adjustable sleeve are respectively provided with one of the positioning features.

In an embodiment of the application, the outer peripheral surface of the adjustable sleeve is ring-shaped, the adjustable sleeve is provided with the plurality of positioning features that are deviated from each other by a distance in the optical fiber extension direction.

In an embodiment of the application, the second fixed end is a convex part, the positioning features are concave parts whose shape match the second fixed end.

In an embodiment of the application, the optical fiber splice further comprises an auxiliary fixed member, the auxiliary fixed member is sleeved on the cable part and is fitted to the carrier.

In an embodiment of the application, two sides of the adjustable sleeve are fitted to the auxiliary fixed member.

In an embodiment of the application, the carrier comprises a base, an upper cover and a circuit board, the base and the upper cover are relatively covered, the circuit board is located on the base.

Therefore, the optical fiber splice with an adjustable sleeve of the present application allows the end position of the cable part to become adjustable, by means of a plurality of positioning features of the adjustable sleeve, under the premise that the position of the second fixed end remains unchanged, so as to adapt to the optical fiber outlet part with the larger manufacturing tolerance, in order to avoid the optical fiber outlet part is so long or so short that assembly damage is caused.

DETAILED DESCRIPTION OF THE INVENTION

Figure 1:
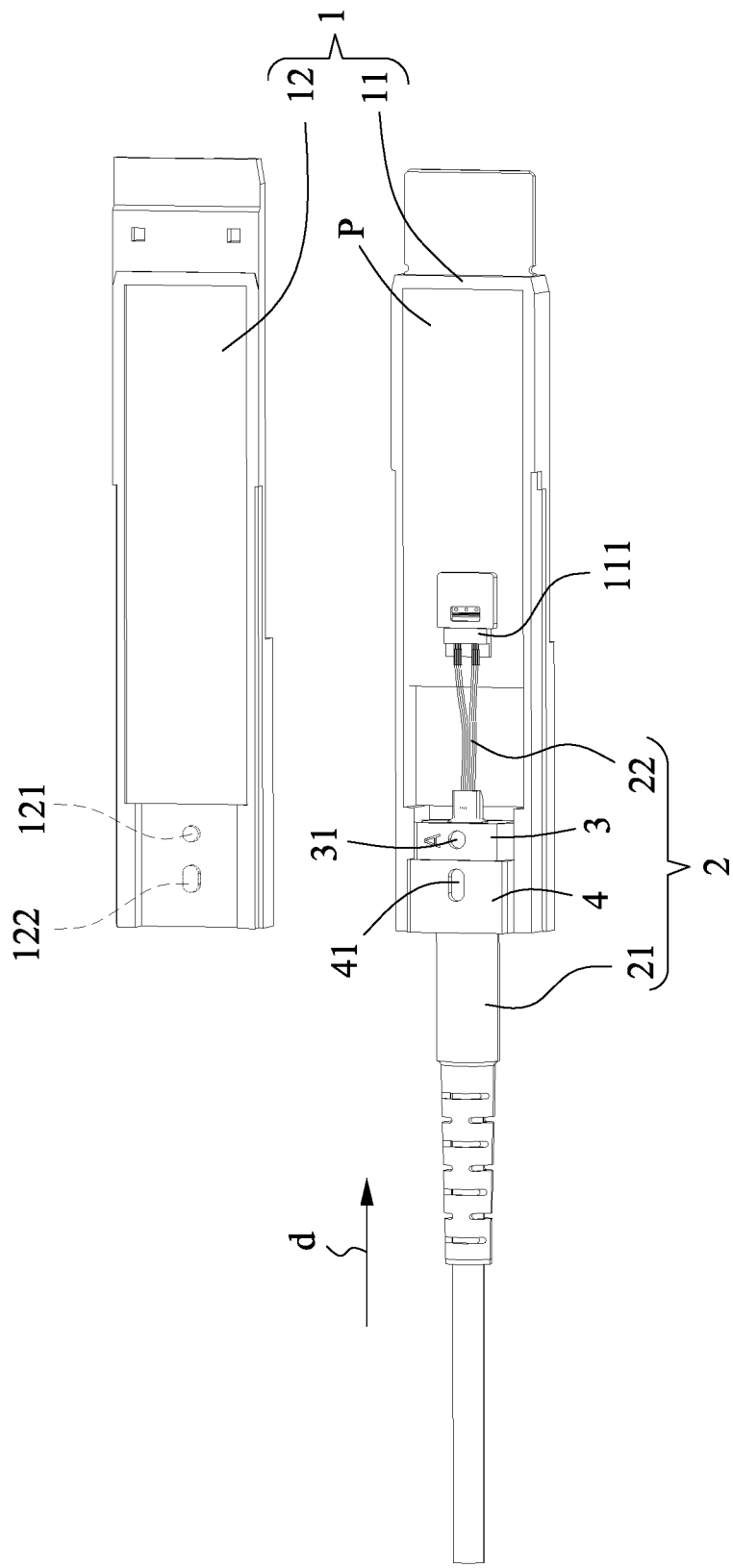
FIG. 1 is a schematic perspective view of an optical fiber splice with an adjustable sleeve according to a first embodiment of the present application.

To facilitate understanding of the present application, embodiments together with the attached drawings for the detailed description of the present application are provided. One skilled in the art can understand the object, characteristics and effects of this present application by the content described in the specification. It should be noted that various possible modifications and alterations to the details of the specification could be carried out by implementing or applying other different embodiments based on different views and applications without departing from the spirit of the present application. The related technical contents of the application will be described in detail by the embodiments. However, the disclosed contents should not be considered to limit the scope of the application. The description is provided as follows:

As shown in FIG. 1, an optical fiber splice 100 with an adjustable sleeve of an embodiment of the application comprises: a carrier 1, an optical fiber cable 2 and an adjustable sleeve 3.

The carrier 1 is used for accommodating and fixing the remaining components of the optical fiber splice 100 with the adjustable sleeve. The carrier 1 has a first fixed end 111 and a second fixed end 121 along an optical fiber extension direction d. The first fixed end 111 and the second fixed end 121 are two positions for fixing the optical fiber cable 2. In the embodiment, the carrier 1 comprises a base 11, an upper cover 12 and a circuit board P, the base 11 and the upper cover 12 are relatively covered, the circuit board P is located on the base 11, the first fixed end 111 and the second fixed end 121 are respectively located on the circuit board P and the upper cover 12. However, the present application is not limited thereto, the circuit board P may be modified to be located in the upper cover 12, both the first fixed end 111 and the second fixed end 121 may be located on the base 11, the circuit board P, or are located on the upper cover 12, and the type of carrier 1 may be changed as needed.

The optical fiber cable 2 has a cable part 21 and an optical fiber outlet part 22, the cable part 21 refers to one or more fibers coated with a protective layer, insulation covered part, the optical fiber outlet part 22 refers to exposed parts of one or more fibers (typically located at the end of the optical fiber splice). The optical fiber outlet part 22 extends from the cable part 21 and is fixed to the first fixed end 111. The optical fiber carries out photoelectric signal conversion in the first fixed end 111, for example, converting the optical signal transmitted by the optical fiber cable 2 into an electric signal, or converting the electric signal into an optical signal, and then transmitted by the optical fiber cable 2.

Figure 3:
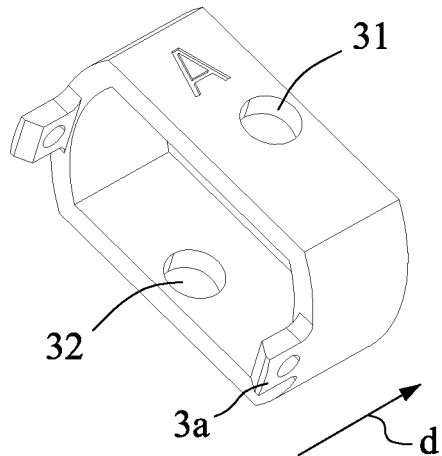
FIG. 3 is a schematic perspective view of the adjustable sleeve according to the first embodiment of the present application.

The adjustable sleeve 3 is sleeved on the cable part 21. As shown in FIG. 3, an outer peripheral surface of the adjustable sleeve 3 is provided with a plurality of positioning features. In the embodiment, the outer peripheral surface of the adjustable sleeve 3 is rectangular (at least two-fold symmetry), upper and lower sides of the adjustable sleeve 3 are respectively provided with a first positioning feature 31 and a second positioning feature 32. In the optical fiber extension direction d, the positions of the first positioning feature 31 and the second positioning feature 32 disposed on the adjustable sleeve 3 are deviated from each other by a distance, one of these positioning features is fixed to the second fixed end 121 of the carrier 1. In the embodiment, the second fixed end 121 is a columnar convex part, the first positioning feature 31/the second positioning feature 32 is a concave part whose shape matches the second fixed end 121. When the carrier 1 is covered at an end of the optical fiber cable 2, the convex part of the carrier 1 is embedded in the concave of the adjustable sleeve 3, so that the optical fiber cable 2 may be fixed to the second fixed end 121 by means of the adjustable sleeve 3. However, the present application is not limited thereto, the shape and structure of the second fixed end 121 and each positioning feature may be simply changed as needed. For example, the second fixed end 121 is a convex/concave structure of other shapes, the first positioning feature 31/the second positioning feature 32 is a concave/convex structure whose shape matches the second fixed end 121.

Next, it will be explained how to use the adjustable sleeve 3 to adapt the optical fiber outlet part 22 with different lengths.

Figure 2:
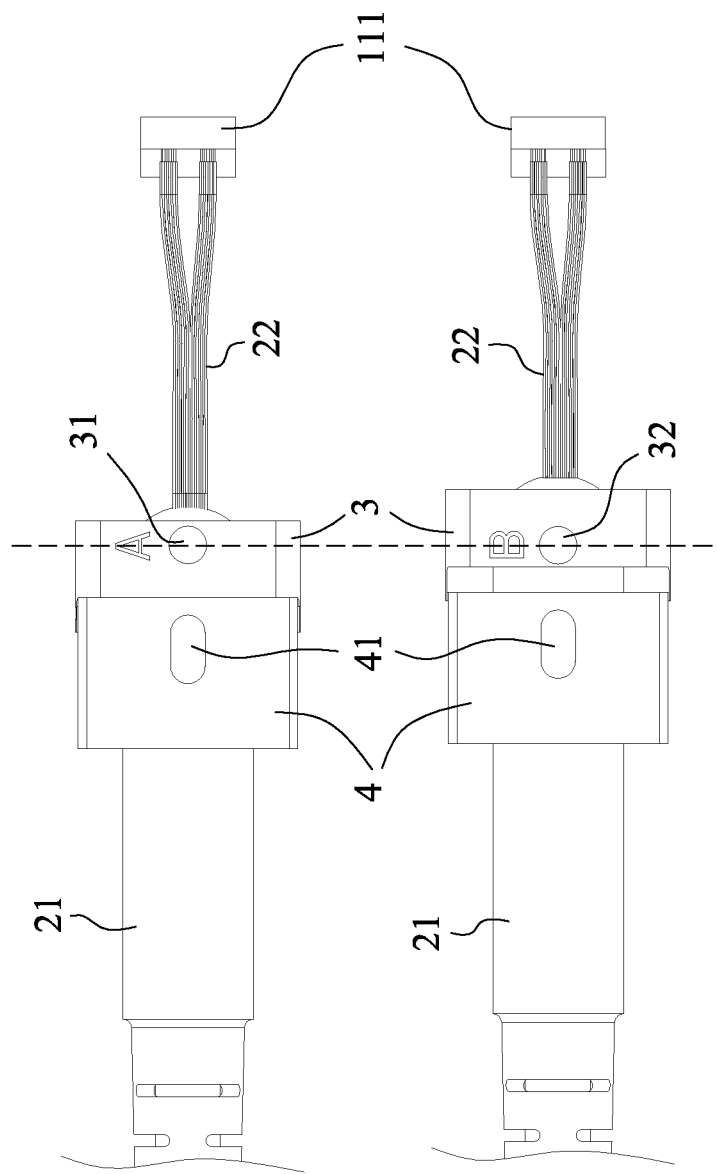
FIG. 2 is a comparison view of different positioning features according to the first embodiment of the present application.

As shown in FIG. 2, a long-dashed line in the figure indicates a position of the second fixed end 121, both the second fixed end 121 and the first fixed end 111 are located on the carrier 1, the distance is a fixed value. In the upper part of FIG. 2, a length of the optical fiber outlet part 22 of the optical fiber cable 2 is a normal range or longish, at this time the first positioning feature 31 is applied, after the adjustable sleeve 3 is fixed to the end of the cable part 21, the first positioning feature 31 is fixed to the second fixed end 121. If the length of the optical fiber outlet part 22 is short, such as the optical fiber cable 2 of the lower part of FIG. 2, when assembling, the adjustable sleeve 3 may be flipped 180 degrees (e.g., flipped 180 degrees to the surface marked with "B" from the surface marked "A" on the figure, "A" and "B" labels can be replaced with other patterns or recognizable marks) and then fixed to the end of the cable part 21; instead, the second positioning feature 32 is fixed to the second fixed end 121. Since the position of the second fixed end 121 remains unchanged, the optical fiber cable 2 is pushed forward along the fiber extension direction d (as shown in the arrow direction of the figure) to adapt to the shorter optical fiber outlet part 22.

In summary, the present application allows the end position of the cable part 21 (i.e., the outlet position of the optical fiber outlet part 22) to become adjustable, by means of a plurality of positioning features of the adjustable sleeve 3, under the premise that the position of the second fixed end 121 remains unchanged, so as to adapt to the optical fiber outlet part 22 with the larger manufacturing tolerance, in order to avoid the optical fiber outlet part 22 is so long or so short that assembly damage is caused.

It should be noted that, for ease of understanding, the offset distance of the first positioning feature 31 and the second positioning feature 32 in the optical fiber extension direction d is exaggerated in the figures, in fact, the offset usually falls in 5% of the length of the outer peripheral surface of the adjustable sleeve 3 in the optical fiber extension direction d, or 1% of the length of the optical fiber outlet part 22. However, the present application does not limit the numerical range of offsets.

Figure 4:
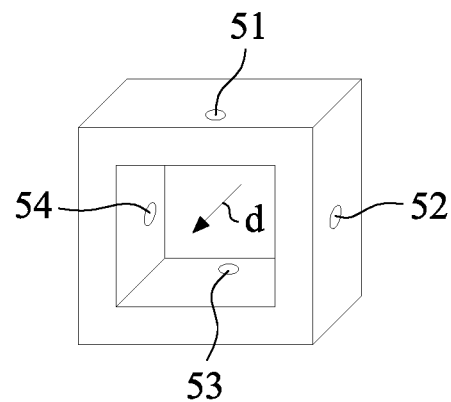
FIG. 4 is a schematic perspective view of the adjustable sleeve according to the second embodiment of the present application.

Further, based on the same concept, the number of positioning features is not limited to two, and the shape of the adjustable sleeve can also be changed as needed. For example, FIG. 4 proposes another embodiment of the adjustable sleeve 5, the outer peripheral surface of the adjustable sleeve 5 is square (4-fold symmetry, that is, rotating 90 degrees around the optical fiber extension direction d, it is still coincident), four sides of the adjustable sleeve 5 are respectively provided with a first positioning feature 51, the second positioning feature 52, the third positioning feature 53 and the fourth positioning feature 54, each the positioning feature offsets from each other by a distance in the optical fiber extension direction d. The positioning features can be selected the most suitable one to match and correspond the second fixed end 121 depending on the length of the optical fiber outlet part 22.

Figure 5:
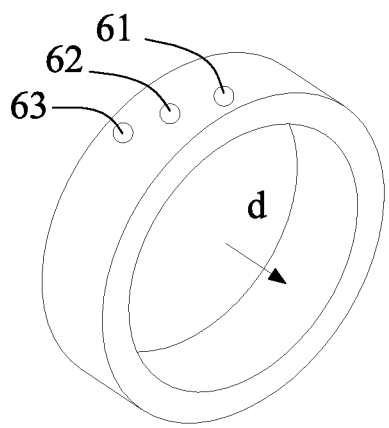
FIG. 5 is a schematic perspective view of the adjustable sleeve according to the third embodiment of the present application.

The maximum number of positioning features disposed on various shapes of adjustable sleeves relates to the geometric symmetry of the outer peripheral surface thereof, and the adjustable sleeve 5 that outer peripheral surface is square may have two to four positioning features. For example, as shown in FIG. 5, in a ring-shaped adjustable sleeve 6 with the outer peripheral surface having an infinite number of symmetric axes, the number of positioning features may be any number more than two. These positioning features are deviated from each other by a distance in the fiber extension direction d. In the embodiment, the adjustable sleeve 6 has three positioning features, the offset of the first positioning feature 61, the second positioning feature 62 and the third positioning feature 63 is a gradual change, in order to facilitate the assembler to select the configuration. However, the present application is not limited thereto, the offset may be changed in other ways, or irregular changes, the number of positioning features and the angle of the setting position thereof may also be increased or decreased as needed.

Further, as shown in FIG. 1, the optical fiber splice 100 with the adjustable sleeve further comprises an auxiliary fixed member 4. The auxiliary fixed member 4 is sleeved on the cable part 21 and is fitted to the third fixed end 122 of the carrier 1 by means of an auxiliary fixed part 41. The auxiliary fixed member 4 provides the optical fiber cable 2 with another anchor point for fixing to the carrier 1.

Further, as shown in FIG. 3, the adjustable sleeve 3 has a connecting arm 3a protruding from each the two sides, the connecting arm 3a is used to fit to the auxiliary fixed member 4. Since the distance between the adjustable sleeve 3 and the auxiliary fixed member 4 will vary slightly (depending on which of the positioning features of the adjustable sleeve 3 is fitted to the second fixed end 121), a mortise of the connecting arm 3a fitting to the auxiliary fixed member 4 is preferably set to tolerate the distance changes described above. For example, a groove of the connecting arm 3a is set wider in the optical fiber extension direction d to allow a bump on the side of the auxiliary fixed member 4 to slip in the groove of the connecting arm 3a.

While the present application has been described by means of specific embodiments, those skilled in the art should understand the above description is merely embodiments of the application, and it should not be considered to limit the scope of the application. It should be noted that all changes and substitutions which come within the meaning and range of equivalency of the embodiments are intended to be embraced in the scope of the application. Therefore, the scope of the application is defined by the claims.

What is claimed is:

1. An optical fiber splice with an adjustable sleeve, comprising:
    a carrier, wherein the carrier has a first fixed end and a second fixed end along an optical fiber extension direction;
    an optical fiber cable, wherein the optical fiber cable has a cable part and an optical fiber outlet part, the optical fiber outlet part extends from the cable part and is fixed to the first fixed end; and
    an adjustable sleeve sleeved on the cable part, wherein an outer peripheral surface of the adjustable sleeve is provided with a plurality of positioning features, wherein in the optical fiber extension direction, the positions of the positioning features disposed on the adjustable sleeve are deviated from each other by a distance, one of the positioning features is fixed to the second fixed end.

2. The optical fiber splice with the adjustable sleeve according to claim 1, wherein the outer peripheral surface of the adjustable sleeve is rectangular, upper and lower sides of the adjustable sleeve are respectively provided with one of the positioning features.

3. The optical fiber splice with the adjustable sleeve according to claim 1, wherein the outer peripheral surface of the adjustable sleeve is square, four sides of the adjustable sleeve are respectively provided with one of the positioning features.

4. The optical fiber splice with the adjustable sleeve according to claim 1, wherein the outer peripheral surface of the adjustable sleeve is ring-shaped, the adjustable sleeve is provided with the plurality of positioning features that are deviated from each other by a distance in the optical fiber extension direction.

5. The optical fiber splice with the adjustable sleeve according to claim 1, wherein the second fixed end is a convex part, the positioning features are concave parts whose shape match the second fixed end.

6. The optical fiber splice with the adjustable sleeve according to claim 1, further comprising an auxiliary fixed member, wherein the auxiliary fixed member is sleeved on the cable part and is fitted to the carrier.

7. The optical fiber splice with the adjustable sleeve according to claim 6, wherein two sides of the adjustable sleeve are fitted to the auxiliary fixed member.

8. The optical fiber splice with the adjustable sleeve according to claim 1, wherein the carrier comprises a base, an upper cover and a circuit board, the base and the upper cover are relatively covered, the circuit board is located on the base.

* * * * *